United States Patent

Liu (10) Patent No.: US 10,116,649 B2
(45) Date of Patent: Oct. 30, 2018

(54) P2P CONNECTING AND ESTABLISHING METHOD AND COMMUNICATION SYSTEM USING THE SAME

(71) Applicants: ThroughTek Technology (ShenZhen) Co., Ltd., Shenzhen (CN); ThroughTek Co., Ltd., Taipei (TW)

(72) Inventor: Kai-Kuo Liu, Taipei (TW)

(73) Assignees: THROUGHTEK TECHNOLOGY (SHENZHEN) CO., LTD., Shenzhen (CN); THROUGHTEK CO., LTD., Taipei (TW)

(*) Notice: Subject to any disclaimer, the term of this patent is extended or adjusted under 35 U.S.C. 154(b) by 279 days.

(21) Appl. No.: 14/926,314

(22) Filed: Oct. 29, 2015

(65) Prior Publication Data

US 2016/0285853 A1    Sep. 29, 2016

(30) Foreign Application Priority Data

Mar. 27, 2015    (TW) .............................. 104110142 A (51) Int. Cl.
H04L 29/06    (2006.01)
H04L 29/08    (2006.01)

(52) U.S. Cl.
CPC .......... *H04L 63/083* (2013.01); *H04L 67/141* (2013.01); *H04L 63/08* (2013.01)

(58) Field of Classification Search
CPC ...... H04L 63/083; H04L 67/141; H04L 63/08

USPC ............................................................ 726/9
See application file for complete search history.

(56) References Cited

U.S. PATENT DOCUMENTS

2015/0074407 A1* 3/2015 Palmeri ............... H04L 63/0807
                                                            713/171
2015/0113172 A1* 4/2015 Johnson .................. H04L 67/34
                                                             709/245

* cited by examiner

*Primary Examiner* — Kambiz Zand
*Assistant Examiner* — Benjamin A Kaplan
(74) *Attorney, Agent, or Firm* — Muncy, Geissler, Olds & Lowe, P.C.

(57) ABSTRACT

A establishing method for a P2P connection includes: receiving a connection request with a remote device from a client device, detecting a validation token in a network packet from the client device according to the connection request, and when the validation token is detected to be valid, executing a connection validation procedure including: receiving a first validation code and a first address information from the client device, reading a second validation code and a second address information from a storage unit, sending the first validation code and the first address information to the remote device, and sending the second validation code and the second address information to the client device. Therefore, the P2P connection between the client device and the remote device is established according to the first validation code, the second validation code, the first address information and the second address information.

15 Claims, 11 Drawing Sheets

P2P CONNECTING AND ESTABLISHING METHOD AND COMMUNICATION SYSTEM USING THE SAME

CROSS-REFERENCES TO RELATED APPLICATIONS

This non-provisional application claims priority under 35 U.S.C. § 119(a) on Patent Application No. 104110142 filed in Taiwan, R.O.C. on Mar. 27, 2015, the entire contents of which are hereby incorporated by reference.

BACKGROUND

Technical Field

The instant disclosure relates to a peer-to-peer (P2P) networks, particularly to P2P connecting and establishing method and communication system using the same.

Related Art

As technology has progressed, the Internet of things (IOT) and cloud computing has been applied to smart home facilities, mobile devices, and industrial system environment. In this Internet environment, people can communicate with each other and obtain information of an electronic device via the Internet, and further the electronic devices can communicate with each other via the IOT.

Due to safety considerations, the connection system confirms an identity of the user by executing an identity authentication when the electronic device of the user wants to be connected to the other electronic devices. There are many authentication methods used for the application systems. Among them, the authentication method based on a password and the authentication method based on a digital certificate are most popular.

The authentication method based on a password is executed to verify the validity of the user's identity based on an account name and the password inputted by the user. The traditional authentication method based on a password is using static password mechanism. In the static password mechanism, the password input by the user is comparing to password stored in a backend server, so as to verify the correctness of the identity and further to verify the validity of the user's identification. In this traditional static password mechanism, there is no protection for the password inputted and transmitted. It may be easy to leak the password, making the system unsafe. Consequently, the dynamic password mechanism has been developed for enhancing the safety of the password. The dynamic password mechanism may generate a one-time password through a dedicated algorithm and synchronization mechanism, so the password may be different every time when the user is registering and further the lack of safety caused by password leakage may be avoided.

However, the authentication method can only verify the validity of the password inputted by the user, but it cannot avoid hacker's device is directly P2P connected to the remote device with the hacked address of the remote device by the hacker.

SUMMARY

In one embodiment, an establishing method for a P2P connection is applied to a link server, and the establishing method is used for establishing a P2P connection between a client device and a remote device via the link server. The establishing method includes: receiving a connection request from the client device for connecting to the remote device; detecting a validation token in a network packet from the client device according to the connection request; and executing a connection verifying procedure when the validation token is detected to be valid. The connection verifying procedure includes: receiving a first validation code and a first address information from the client device; reading a second address information and a second validation code of the remote device from a storage unit; and sending the received first validation code and the received first address information to the remote device and sending the read second address information and the read second validation code to the client device, so as to establish the P2P connection between the client device and the remote device according to the first address information, the first validation code, the second address information, and the second validation code.

In one embodiment, a P2P connecting method is applied to a client device and is used for creating a P2P connection to a remote device through a link server. The P2P connecting method includes: sending a connection request to the link server for connecting to the remote device; searching for a validation token to verify whether the validation token exists; sending the validation token to the link server when the validation token exists; detecting a first acknowledgement packet returned by the link server to confirm whether the first acknowledgement packet representing that the validation token is verified successfully is received; and executing a connection verifying procedure when the first acknowledgement packet is received. The connection verifying procedure includes: generating a first validation code; storing the first validation code; sending the first validation code and a first address information to the link server; receiving a second address information and a second validation code of the remote device from the link server; and creating the P2P connection to the remote device according to the second address information, the first validation code, and the second validation code.

In one embodiment, a communication system for a P2P connection includes a link server, a client device and a remote device. The client device communicates with the link server, and is used for sending a connection request to the link server, generating a first validation and sending the first validation code and a first address information of the client device to the link server. The remote device communicates with the link server, and is used for generating a second validation code and sending the second validation code and a second address information of the remote device to the link server. The link server verifies whether the client device has a valid validation token according to the connection request. When the client device has the valid validation token, the link server receives the first validation code and the first address information, sends the received first validation code and the received first address information to the remote device, and sends the second address information and the second validation code to the client device, so as to establish the P2P connection between the client device and the remote device according to the first address information, the first validation code, the second address information, and the second validation code.

As above, according to the P2P connecting and establishing method and communication system, two-phase dynamic verification (such as the client device requests for connection based on the validation token sent by the link server, and the client device and the remote device send the validation codes to each other for verification), and both parties verification (such as the client device and the remote device send the validation codes to each other for verification), are implemented to improve the safety of the P2P connection between the client device and the remote device.

DETAILED DESCRIPTION

The terms "first" and the "second" and the like in the description and in the claims are used for distinguishing between similar elements and not for describing a sequential or chronological order and not for limiting the present invention unless such an ordering is otherwise indicated explicitly.

Figure 1:
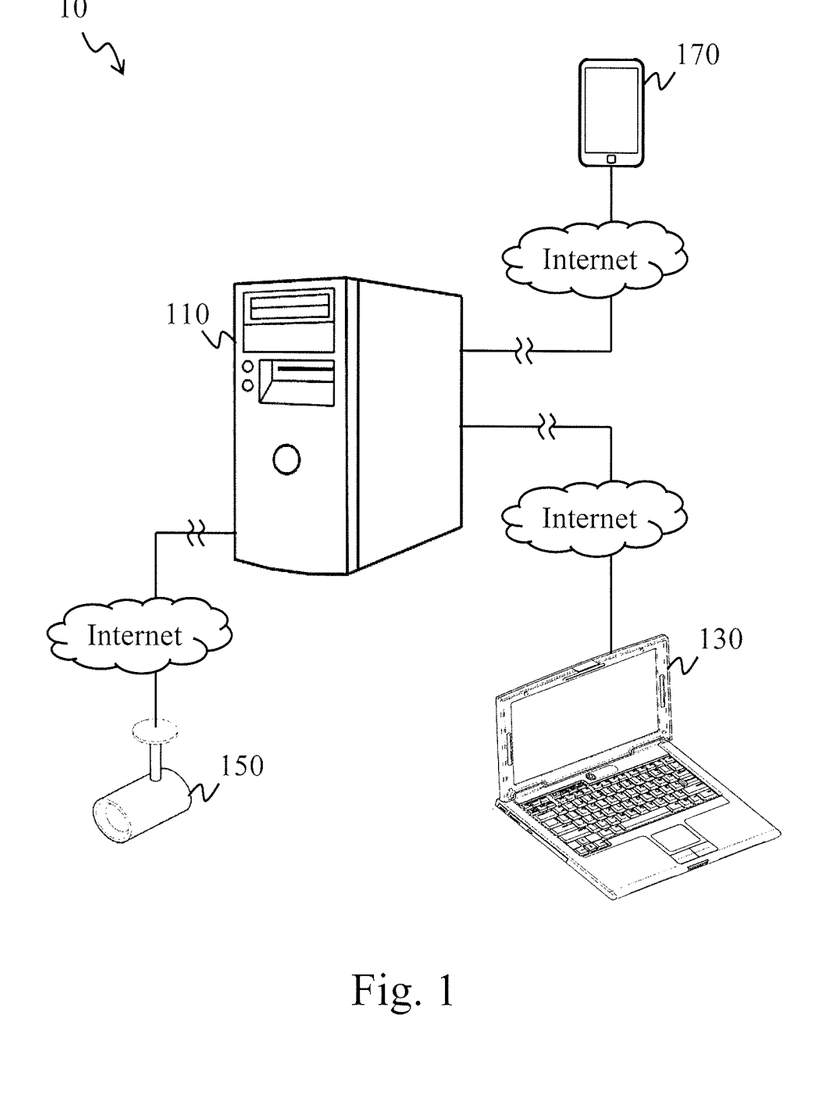
FIG. 1 is a schematic view showing a communication system by using P2P connecting method according to one embodiment of the instant disclosure.

FIG. 1 is a schematic view showing a communication system by using P2P connecting method according to one embodiment of the instant disclosure. Referring to FIG. 1, in an embodiment, the communication system 10 comprises a link server 110, a client device 130, and a remote device 150. The client device 130 and the remote device 150 may be any electronic device having the capability of connecting to the Internet. The client device 130 represents active equipment which takes the initiative to request a connection, such as a personal computer (PC), a smart phone, a portable navigation device (PND), a notebook, a tablet, a pad, or a smart home facility. The remote device 150 represents passive equipment which is connected to another device by a request, such as a video camera, an Internet protocol camera (IP cam), or a smart home facility.

Figure 2:
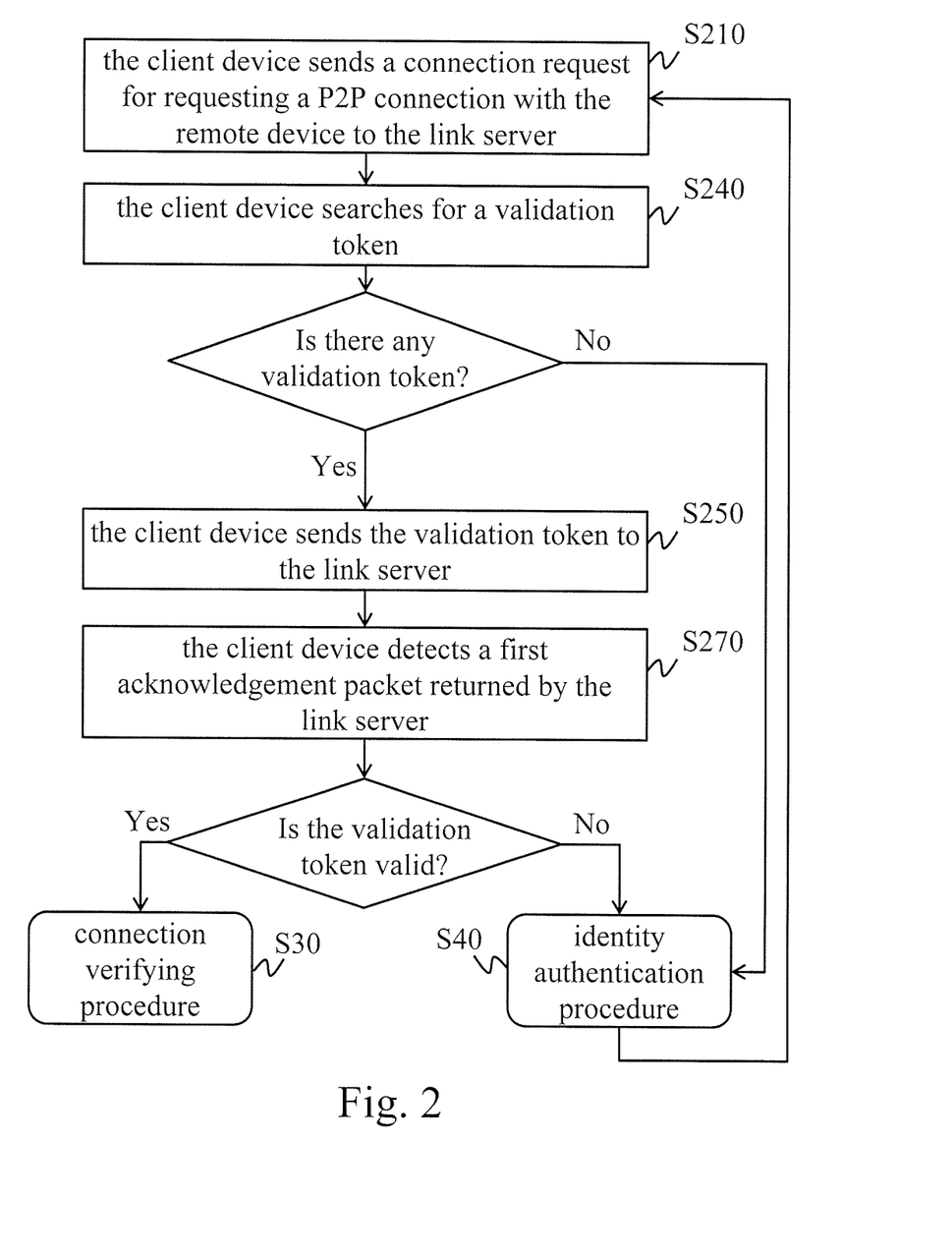
FIG. 2 is a flow chart showing a P2P connecting method according to one embodiment of the instant disclosure.
Figure 3:
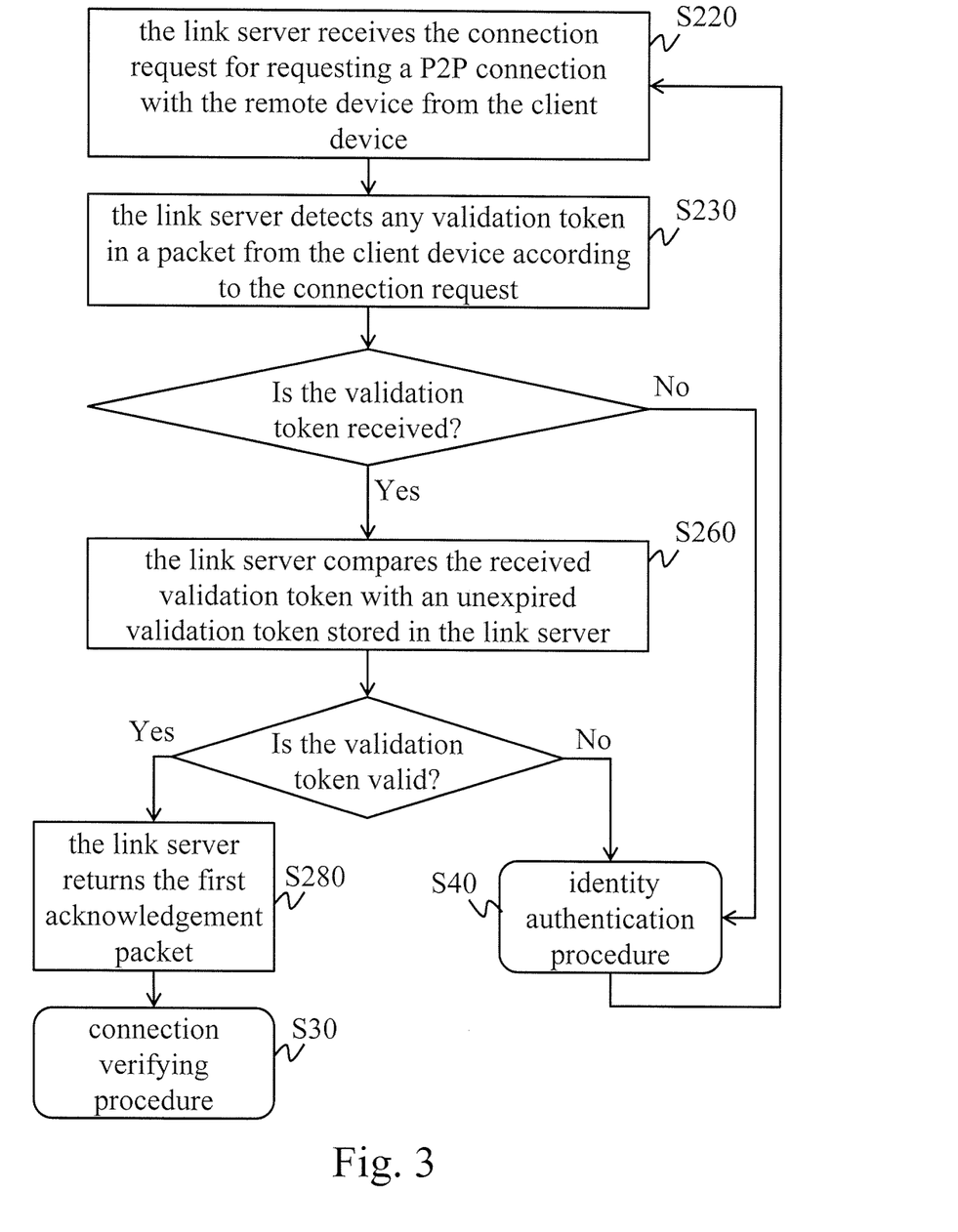
FIG. 3 is a flow chart showing an establishing method for P2P connections according to one embodiment of the instant disclosure.

Please refer to FIG. 1, FIG. 2 and FIG. 3. In some embodiments, when the client device 130 wants to connect to the remote device 150 via the link server 110, the client device 130 connects to and communicates with the link server 110 via the Internet communication. When the communication is connected, the client device 130 sends a connection request Scr for requesting a P2P connection with the remote device 150 to the link server 110 (S210), as shown in FIG. 4A.

Figure 4A:
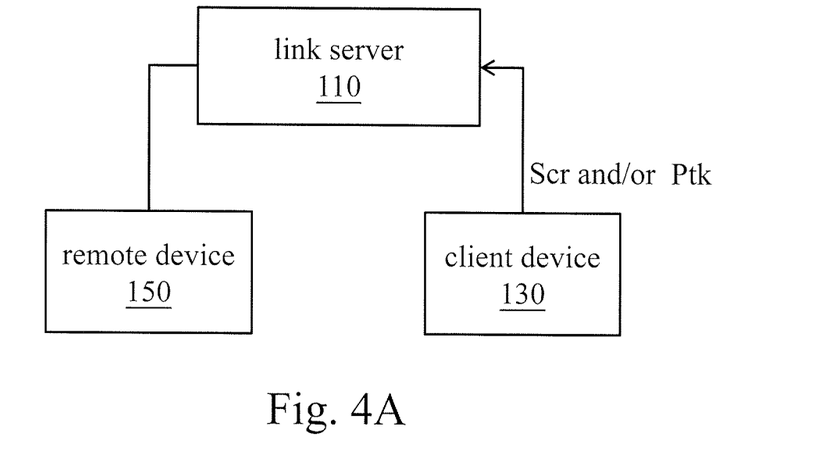
FIGS. 4A to 4D integrate into a schematic view of operation for the communication system by using P2P connecting method according to one embodiment of the instant disclosure.

After the link server 110 receives the connection request Scr (Step S220), the link server 110 detects a validation token Ptk in a network packet from the client device 130, to confirm whether there is the validation token Ptk in the network packet or not and, if the network packet has the validation token Ptk, to verify whether the validation token Ptk therein is valid or not (Step S230), as shown in FIG. 4A. The link server 110 generates and sends the validation token Ptk to the client device 130. The validation token Ptk is a time-limited or one-time-used effective string having multiple characters. In some embodiments, the string length of the validation token Ptk is thirty two to sixty four characters.

Figure 4B:
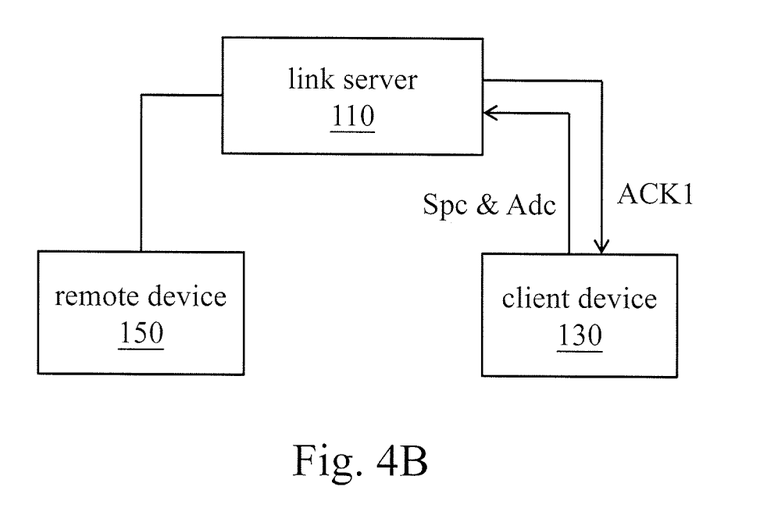

Once connected, the client device 130 searches for a validation token Ptk, to verify whether there is any validation token Ptk stored in a storage unit of the client device 130 or not (Step S240). When the validation token Ptk is stored in the client device 130, the client device 130 sends the connection request Scr and the validation token Ptk to the link server 110 via the Internet (Step S250), and detects a first acknowledgement packet ACK1 returned by the link server 110, which means that the validation token Ptk is verified successfully (Step S270). After the link server 110 received the validation token Ptk from the client device 130, the link server 110 confirms whether the received validation token Ptk (from the client device 130) is consistent with the validation token (unexpired) stored in the link server 110 or not (Step S260). When the link server 110 confirms that the received validation token Ptk (from the client device 130) conforms to the validation token stored in the link server 110, the link server 110 verifies that the received validation token Ptk is valid (i.e. the client device 130 has the valid validation token Ptk) and returns the first acknowledgement packet ACK1 to the client device 130 (Step S280), as shown in FIG. 4B, to continue executing a connection verifying procedure (Step S30). The client device 130 receives the first acknowledgement packet ACK1, meaning that the validation token Ptk was verified successfully; that is, the client device 130 has the valid validation token Ptk, as shown in FIG. 4B, and responds to the first acknowledgement packet ACK1 to execute a connection verifying procedure (Step S30).

In contrast, when the link server 110 doesn't receive a validation token Ptk from the client device 130 or receives an expired validation token Ptk, which is different from the validation token stored in the link server 110, then the link server 110 does not send back the first acknowledgement packet ACK1 and does execute an identity authentication procedure (Step S40).

Figure 5:
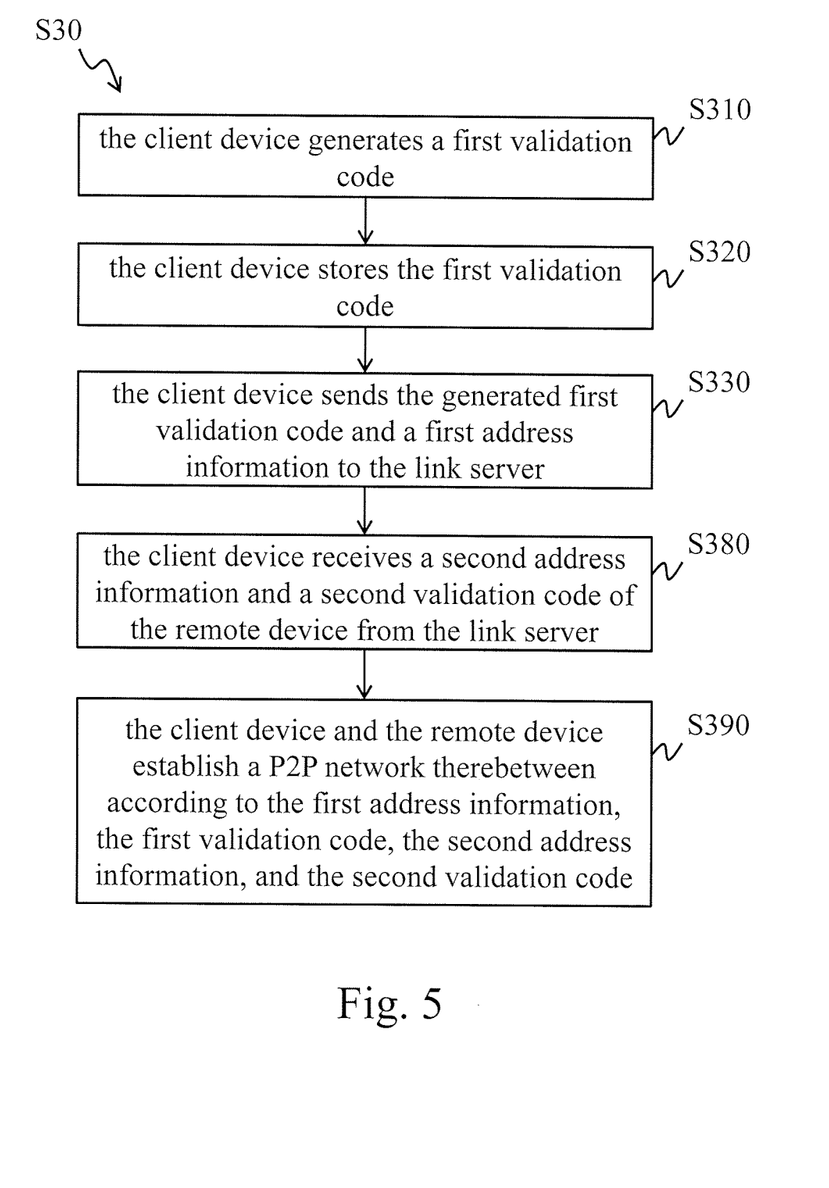
FIG. 5 is a detail flow chart showing a connection verifying procedure for a client device according to one embodiment of the instant disclosure.

Accompanying FIG. 5, in the connection verifying procedure (Step S30), the client device 130 generates a first validation code Spc (Step S310), and stores the first validation code Spc into the storage unit of the client device 130 (Step S320). Subsequently, the client device 130 sends the generated first validation code Spc and the address information thereof to the link server 110 via the Internet (Step S330), as shown in FIG. 4B. Hereafter, the address information of the client device 130 is referred to as a first address information Adc.

In some embodiments, the client device 130 generates the first validation code Spc with a random number. The first validation code Spc is a string having multiple characters. In some embodiments, the string length of the first validation code Spc is thirty two characters.

Figure 4C:
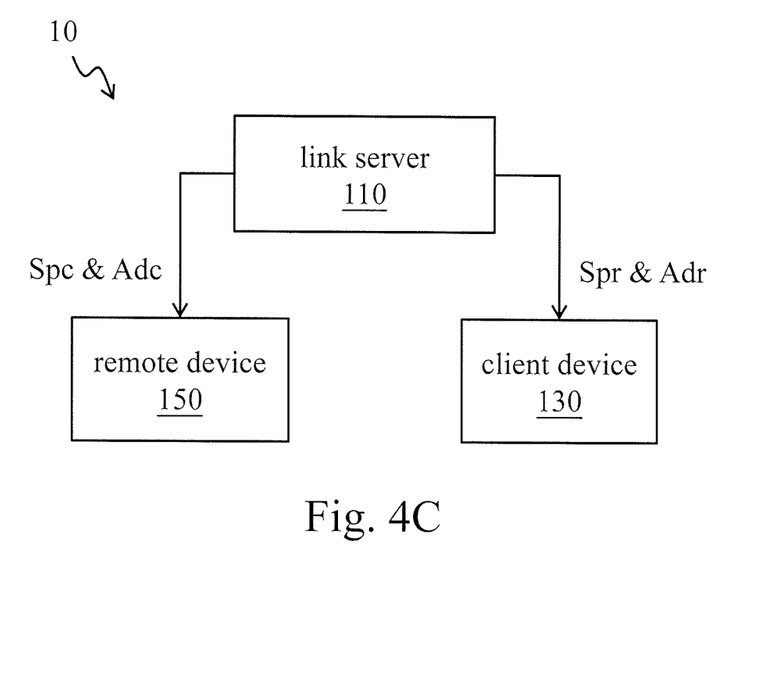
Figure 6:
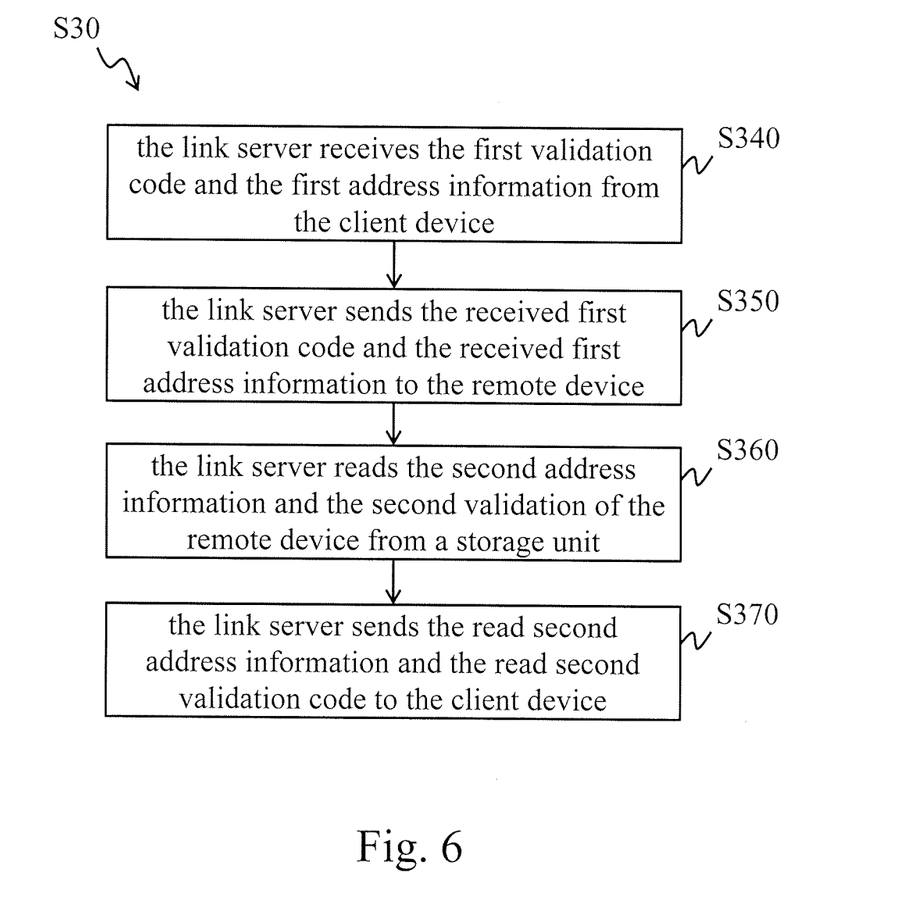
FIG. 6 is a detail flow chart showing a connection verifying procedure for a link server according to one embodiment of the instant disclosure.

Accompanying FIG. 6, the link server 110 receives the first validation code Spc and the first address information Adc from the client device 130 via the Internet (Step S340), and sends the received first validation code Spc and the received first address information Adc to the remote device 150 via the Internet (Step S350), as shown in FIG. 4C. The remote device 150 receives the first validation code Spc and the first address information Adc and stores the received first validation code Spc and the received first address information Adc into a storage unit of the remote device 150.

In addition, the link server 110 reads an address information of the remote device 150 and a second validation code Spc of the remote device 150 from a storage unit of the link server 110 (Step S360). Hereafter, the address information of the remote device 150 is referred to as second address information Adr. The link server 110 connects to the client device 130 via the Internet and sends the read second address information Adr and the read second validation code Spr to the client device 130 via the Internet (Step S370), as shown in FIG. 4C.

The client device 130 receives the second address information Adr and the second validation code Spr of the remote device 150 from the link server 110 via the Internet (Step S380).

Subsequently, the client device 130 and the remote device 150 may collaborate with each other according to the first address information Adc, the first validation code Spc, the second address information Adr, and the second validation code Spr, to establish the P2P connection between the client device 130 and the remote device 150 (Step S390).

Figure 4D:
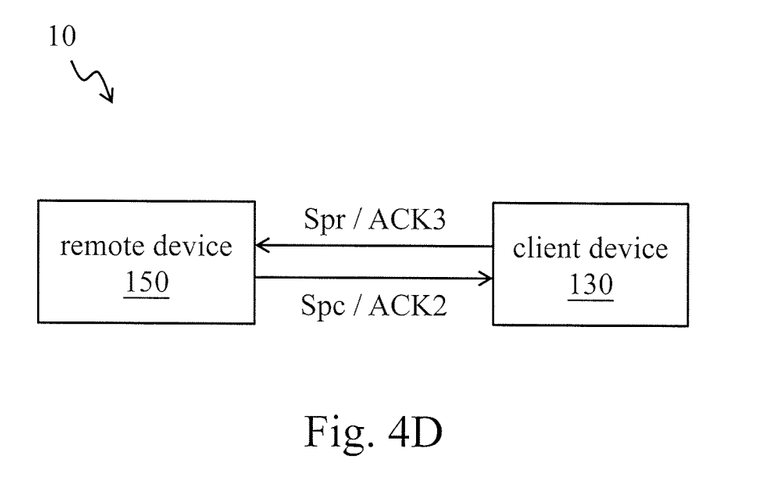
Figure 7:
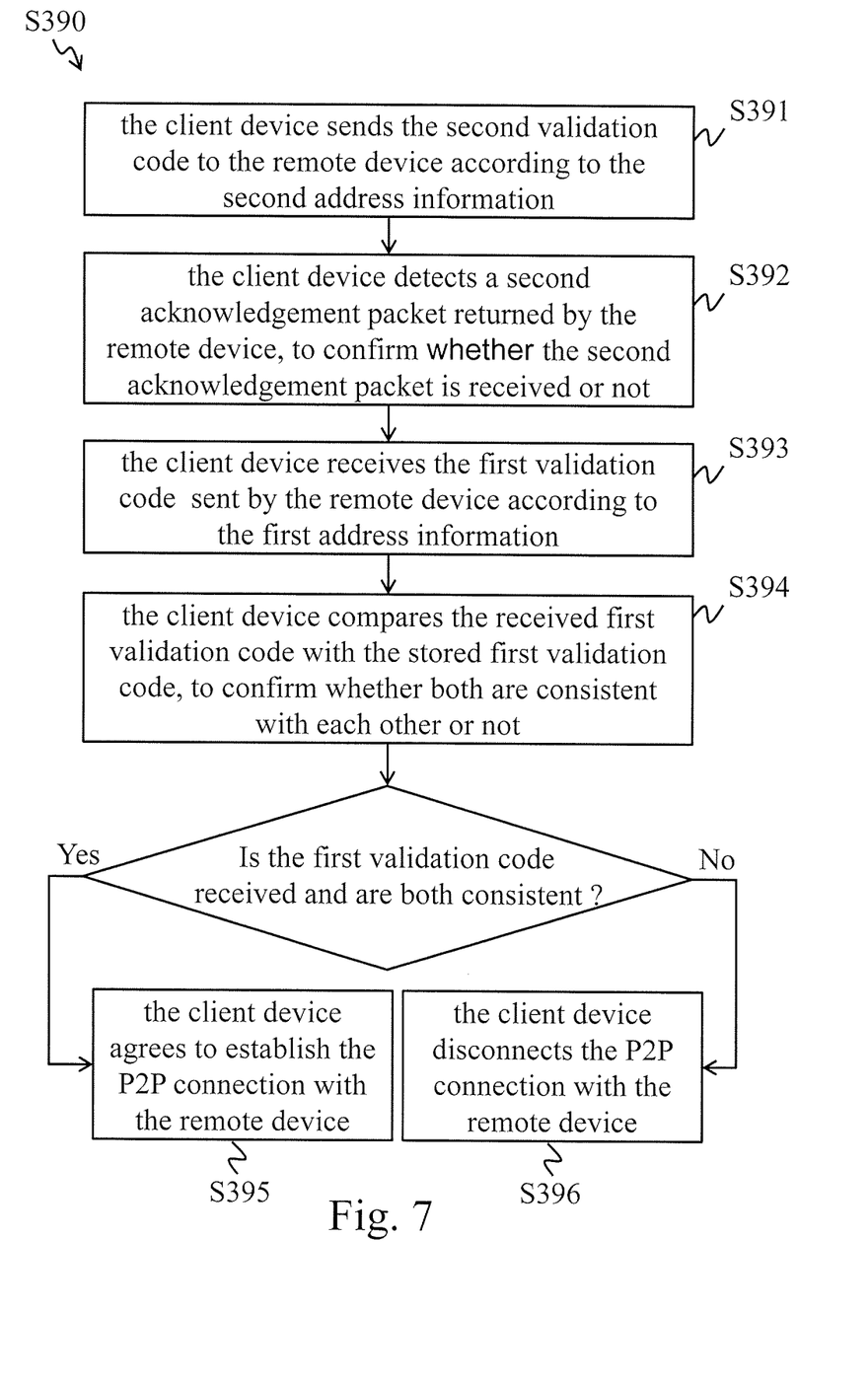
FIG. 7 is a detail flow chart showing Step S390 of FIG. 5 according to one embodiment of the instant disclosure.

In some embodiments, referring to FIG. 7, for establishing the P2P connection, the client device 130 connects with the remote device 150 according to the second address information Adr via the Internet, while the remote device 150 connects with the client device 130 according to the first address information Adc via the Internet, so as to establish the communication connection therebetween. When the communication connection is established, the client device 130 sends the second validation code Spr to the remote device 150 (Step S391), as also shown in FIG. 4D, for providing the remote device 150 making verification with the received second validation code Spr. After sending the second validation code Spr, the client device 130 detects second acknowledgement packet ACK2 (which represents that the second validation code Spr is verified successfully) from the remote device 150, to confirm whether the second acknowledgement packet ACK2 is received or not (Step S392).

The remote device 150 receives the second validation code Spr sent from the client device 130, and confirms whether the received second validation code Spr (from the client device 130) conforms to the second validation code Spr stored in the remote device 150 or not. When the remote device 150 confirms that the received second validation code Spr (from the client device 130) conforms to the second validation code Spr stored in the remote device 150, that is, the second validation code Spr is verified successfully, the remote device 150 returns the second acknowledgement packet ACK2 to the client device 130 via the Internet.

In addition, when the client device 130 connects to and communicates with the remote device 150, the remote device 150 sends the first validation code Spc received from the link server 110 via the Internet to the client device 130 for verifying, as shown in FIG. 4D. The client device 130 receives the first validation code Spc from the remote device 150 via the Internet (Step S393), as shown in FIG. 4D. Next, the client device 130 compares the received first validation code Spc (from the remote device 150) with the stored first validation code Spc (Step S394).

When the client device 130 receives the second acknowledgement packet ACK2 and confirms that the received first validation code Spc conforms to the stored first validation code Spc, that is, the first validation code Spc is verified successfully, the client device 130 confirms the P2P connection with the remote device 150 is effective and agrees to establish the P2P connection with the remote device 150 (Step S395). When the client device 130 doesn't receive the second acknowledgement packet ACK2 and/or the received first validation code Spc does not conform to the stored first validation code Spc, that is, the first validation code Spc failed verification, the client device 130 disconnects the P2P connection with the remote device 150 (Step S396).

When the client device 130 verifies the first validation code Spc successfully, the client device 130 returns a third acknowledgement packet ACK3 (which represents that the first validation code Spc is verified successfully) back to the remote device. When the remote device 150 receives the third acknowledgement packet ACK3 and verifies the second validation code Spr successfully, the remote device 150 confirms that the P2P connection with the client device 130 is effective and agrees to establish the P2P connection with the client device 130. When remote device 150 doesn't receive the third acknowledgement packet ACK2 and/or the received second validation code Spc (from the client device 130) does not conform to the stored second validation code Spc, that is, the second validation code Spc failed verification, the remote device 150 disconnects the P2P connection with the client device 130.

In other words, only when both the client device 130 and the remote device 150 agree to the establishment of the P2P connection, can the client device 130 and the remote device 150 create and establish the P2P connection therebetween. If either of the client device 130 and the remote device 150 disagrees to establish the P2P connection, the P2P connection between the client device 130 and the remote device 150 is disconnected immediately.

In some embodiments, the communication system 10 may further includes a specific device 170, as shown in FIG. 1. The link server 110 may connect to and communicated with the specific device 170. The specific device 170 may be any equipment capable of receiving remote information, such as a PC, a mobile phone, a portable navigation device (PND), a notebook, a tablet or pad, or a smart home facility.

Figure 8:
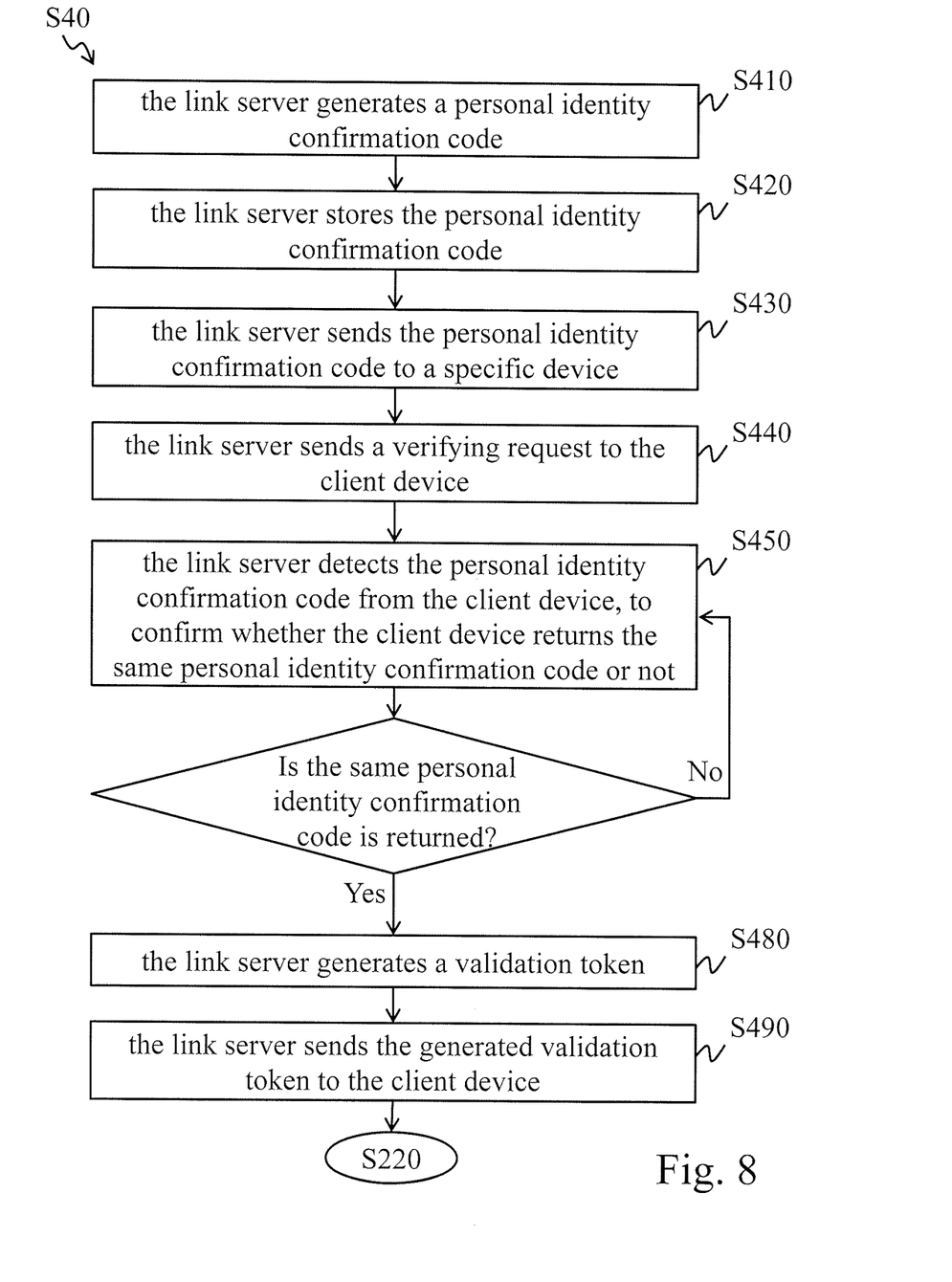
FIG. 8 is a detail flow chart showing an identity authentication procedure for a link server according to one embodiment of the instant disclosure.

Accompanying FIG. 8, in an identity authentication procedure (Step S40), the link server 110 generates a personal identity confirmation code (Step S410). The link server 110 stores the generated personal identity confirmation code Pc into the storage unit of the link server 110 (Step S420), and sends the generated personal identity confirmation code Pc to a specific device 170 (Step S430), as shown in FIG. 9A.

In some embodiments, the storage unit of the link server 110 may store with a device registration table. The device registration table records a binding information, that is, lists a login name of a registered remote device 150, a contact account of the specific device 170 binds with the remote device 150, address information of the remote device 150, the first validation code Spc of the remote device 150, and a corresponding personal identity confirmation code Pc of the remote device 150 (which is the personal identity confirmation code Pc stored by the link server 110). In an embodiment of the Step S430, the link server 110 sends a notification having the personal identity confirmation code to the contact account of the specific device 170 which is listed on the device registration table.

The address information may be, such as, IP address, URL (Uniform/Universal Resource Locator), or the like, etc. The contact account may be telephone numbers, email address, communication software account (such as SKYPE, LINE, What's App, Wechat, or QQ, etc.), and Internet community account (such as Facebook, google+, MSN, Gtalk, M+messenger, plurk, or twitter, etc.). The notification may be text information, picture information, voice information, multimedia information, or a combination thereof. For example, when the specific device 170 is a mobile phone, the contact account of the specific device 170 may be telephone numbers. In the Step S430, the link server 110 reads the telephone numbers of the specific device 170 (binding with the remote device 150), from the device registration table and sends a text or voice message with the generated personal identity confirmation code Pc to the read telephone numbers.

Figure 9A:
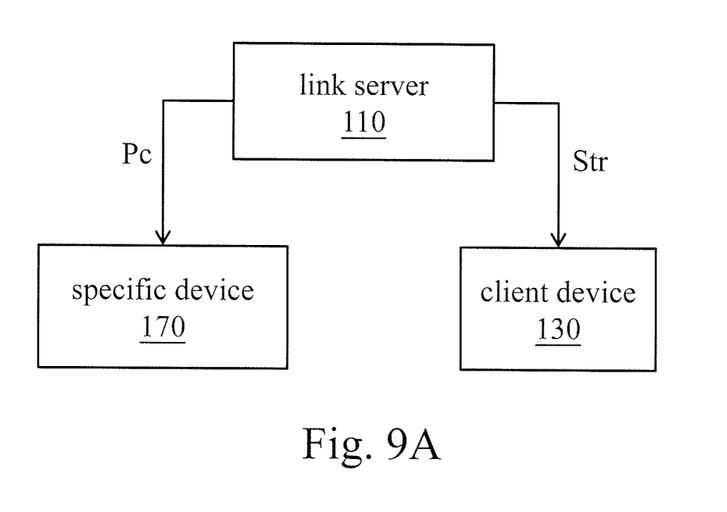
FIGS. 9A to 9B integrate into a schematic view of operation for the communication system by using P2P connecting method according to another embodiment of the instant disclosure.

The link server 110 sends a verifying request Str to the client device 130 via the Internet (Step S440), to request the client device 130 provides the personal identity confirmation code Pc, as shown in FIG. 9A. Subsequently, the link server 110 detects the personal identity confirmation code Pc from the client device 130 and confirms whether the client device has sent back the same personal identity confirmation code Pc (Step S450).

Figure 9B:
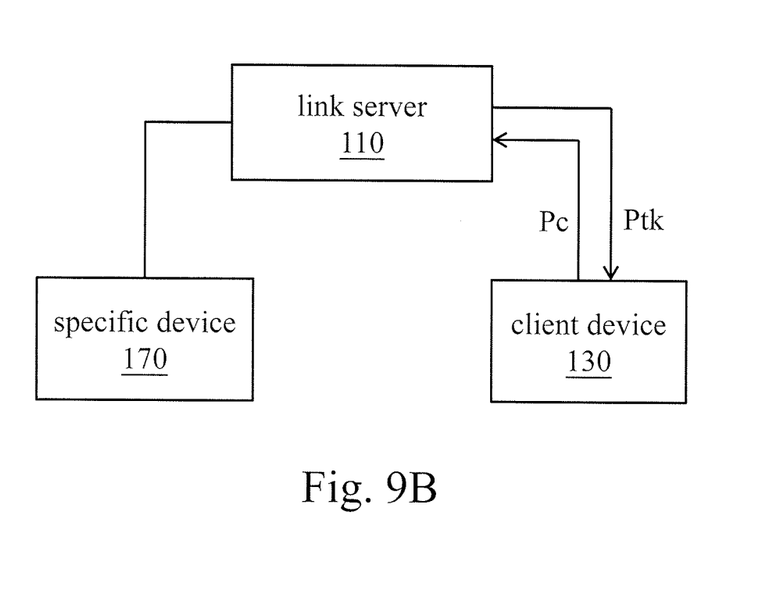
Figure 10:
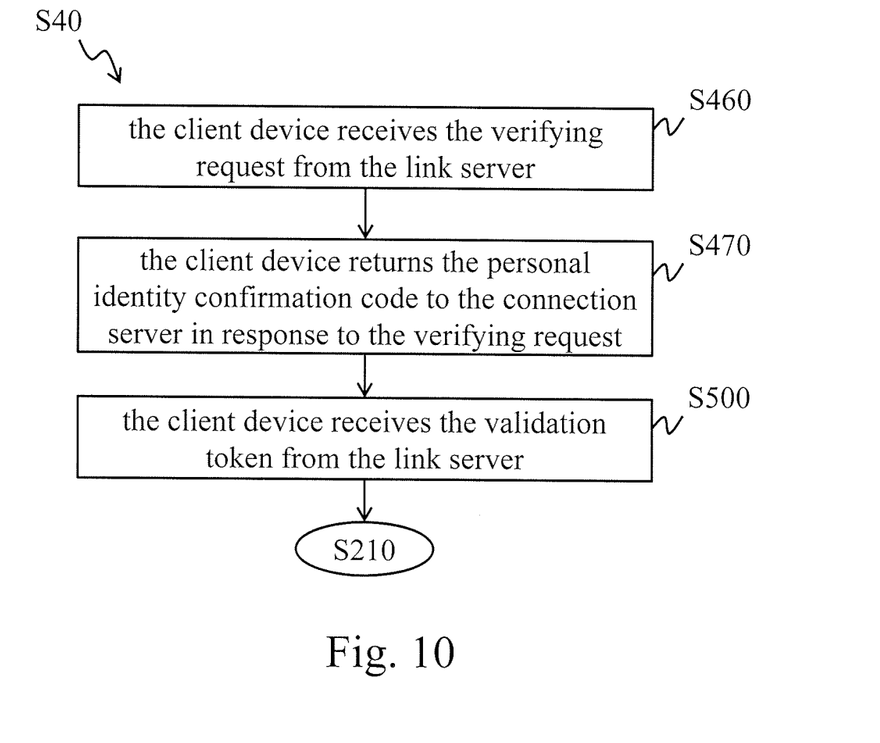
FIG. 10 is a detail flow chart showing an identity authentication procedure for a client device according to one embodiment of the instant disclosure.

Accompanying FIG. 10, the client device 130 receives the verifying request Str from the link server 110 via the Internet (Step S460), so as to inform the user of the client device 130 to input the personal identity confirmation code Pc. The user of the client device 130 must acquire the personal identity confirmation code Pc from the specific device 170 and to input the acquired personal identity confirmation code Pc to the client device 130 through the user interface thereof. Responding to the verifying request Str, the client device 130 returns the personal identity confirmation code Pc back to the link server 110 via the Internet (Step S470), as shown FIG. 9B.

As such, the link server 110 receives the returned personal identity confirmation code Pc from the client device 130 via the Internet and comparing the received personal identity confirmation code Pc (from the client device 130) with the stored personal identity confirmation code Pc. When the link server 110 confirms that the received personal identity confirmation code Pc (from the client device 130), conforms to the stored personal identity confirmation code Pc, that is, the identity is verified successfully, the link server 110 generates a new validation token Ptk (Step S480), and sends the generated new validation token Ptk to the client device 130 via the Internet (Step S490). Meanwhile, the link server 110 replaces/updates the validation token Ptk stored in the storage unit by the generated new validation token Ptk for initial verification in following connection (following to execute Step S220).

When the link server 110 confirms that the received personal identity confirmation code Pc (from the client device 130) does not conforms to the stored personal identity confirmation code Pc, that is, the identity failed verification, the link server 110 records the failure numbers of the unsuccessful verification. The link server 110 determines whether the failure numbers reaches a threshold number or not. When the failure numbers of the unsuccessful verification does not reach the threshold number, the link server 110 returns a failure message to the client device 130 (not shown), so as to inform the client device 130 to input the personal identity confirmation code again (that is, back to Step S450). When the failure numbers of the unsuccessful verification reaches the threshold number, the link server 110 disconnects with the client device 130 and sends a warning message to the specific device 170 (not shown), so as to warm the user of the specific device 170 that an unknown device is trying to connect with the remote device 150.

When the client device 130 receives the generated new validation token Ptk from the link server 110 (Step S500), via the Internet, then it may again request the link server 100 for P2P connection with the remote device 150 (that is, return to Step S210 for continued execution).

It should be noted that the embodiment described above is made by ordering sequence, however, which is used for the purpose of describing particular embodiments only and is not intended to be limiting of the invention. It is to be understood that the terms so used are interchangeable under appropriate circumstances and that the embodiments of the invention described herein are capable of operation in other sequences than described or illustrated herein. For example, if the Step S360 is executed before the Step S370, both the Step S360 and the Step S370 may be executed before the Step S340 or Step S350 or at the same time.

Figure 11:
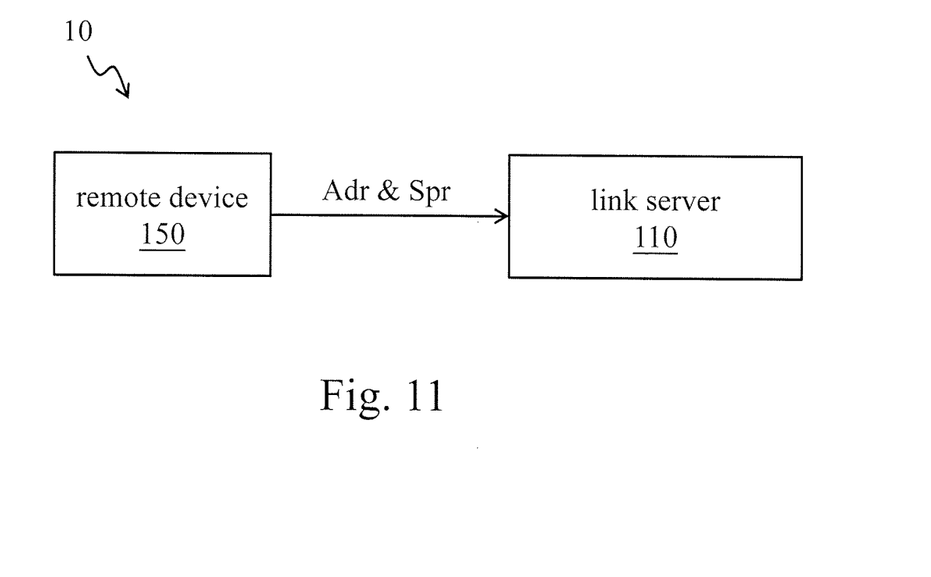
FIG. 11 is a schematic view showing an example of the remote device updating related information.

In some embodiments, the remote device 150 may use a registered login name to periodically log in the link server 110 so as to renew the second address information Adr and second validation code Spr of the remote device 150 stored in the link server 110. In other words, the remote device 150 may connect to and communicate with the link server 110 periodically. When in communication connection, the remote device 150 generates a second validation code Spr by random numbers, stores the new generated second validation code Spr, and sends the second address information Adr of the remote device 150 and the new generated second validation code Spr to the link server 110, as shown in FIG. 11. The link server 110 receives the second address information Adr and the new generated second validation code Spr from the remote device 150 and replaces/updates the address information Adr and the second validation code Spr of the remote device 150 stored in the storage unit with the received the second address information Adr and the new generated second validation code Spr (registering in the device registration table).

In some embodiments, the link server 110, the client device 130, the remote device 150, and the specific device 170 each at least comprises a processing unit, a storage unit, and an Internet connectable unit. The processing unit is used to control the operation of the other unit(s) for executing the above corresponding steps. The Internet connectable unit is used to connect to and communicate with other outer device(s) (such as a link server 110, client device 130, the remote device 150, or the specific device 170). In some embodiments, the link server 110, the client device 130, the remote device 150, and the specific device 170 each further comprises user interface for the user to set the device(s) and to input outer information (for example, to input the personal identity confirmation code to the client device 130).

In some embodiments, the establishing method for P2P connection according to the present invention accompanies the connecting method for P2P connection of the present invention for execution. According to the establishing method for P2P connection of the present invention, the processing unit may execute the firmware or software stored in the storage, and the establishing method may be implemented on the link server 110. According to the connecting method for P2P connection of the present invention, the processing unit may execute the firmware or software stored in the storage, and the connecting method may be implemented on the client device 130. In other words, the storage unit may be used for storing related software/firmware, programs, information, data, or any combination thereof.

Each processing unit may be implemented by one or more processors. The processor may be micro-processor, micro controller, digital signal processor, microcomputer, central processor, field programmable gate array, programmable logic device, the state controller, logic circuit, analog circuit, digital circuit and/or any signal (analog and/or digital), equipment operated based on operating instruction. Each storage unit may be one or more storing elements. The storing element may be, for example, memory or register etc., but which are not used to limit the present invention. Memory may be, for example, ROM, RAM, volatile memory, non-volatile memory, static memory, dynamic memory, flash memory, and/or any digital information storable equipment. Each Internet connectable unit may be a wireless Internet connection module, wireless communication module, or any combination thereof. The above-described user interface may be a touch screen, a combination of general display with multiple physics pressing keys (or keyboards), or a combination of touch screen with one or more physics pressing keys (or keyboards).

As above, according to the P2P connecting and establishing method and communication system, two-phase dynamic verification (such as the client device requests for connection based on the validation token sent by the link server, and the client device and the remote device send the validation codes to each other for verification), and both parties verification (such as the client device and the remote device send the validation codes to each other for verification), are implemented to improve the safety of the P2P connection between the client device and the remote device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An establishing method for a P2P connection, applied to a link server, for establishing a P2P connection between a client device and a remote device, the establishing method comprising:
   receiving, by the link server, a connection request from the client device, wherein the connection request is for requesting to be connected to the remote device;
   detecting, by the link server, a validation token in a network packet from the client device according to the connection request; and
   executing, by the link server, a connection verifying procedure when the validation token from the client device is detected to be valid, wherein the connection verifying procedure comprises:
      receiving a first validation code and a first address information of the client device from the client device;
      reading a second address information of the remote device and a second validation code of the remote device from a storage unit; and
      sending the received first validation code and the received first address information of the client device to the remote device and sending the read second address information of the remote device and the read second validation code to the client device, so as to establish the P2P connection between the client device and the remote device according to the first address information, the first validation code, the second address information, and the second validation code.

2. The establishing method according to claim 1, further comprising:
   executing, by the link server, an identity authentication procedure when the valid validation token is not detected, wherein the identity authentication procedure comprises:
      generating a first personal identity confirmation code;
      sending the first personal identity confirmation code to a specific device, wherein the specific device binds with the remote device;
      sending a verifying request to the client device, wherein the verifying request is used for requesting request the client device to return a second personal identity confirmation code;
      detecting the second personal identity confirmation code returned by the client device to confirm whether the second personal identity confirmation code is the same as the first personal identity confirmation code or not; and
      generating the validation token and sending the generated validation token to the client device when the second personal identity confirmation code is the same as the first personal identity confirmation code.

3. The establishing method according to claim 2, wherein the link server stores a binding information representing that the specific device binds with the remote device, the binding information comprises a contact account of the specific device and a corresponding login name of the remote device, wherein the step of sending the first personal identity confirmation code to the specific device comprises: sending a notification having the personal identity confirmation code to the contact account.

4. The establishing method according to claim 2, wherein the personal identity confirmation code is a time-based personal identity confirmation code or a one-time personal identity confirmation code.

5. The establishing method according to claim 1, further comprising:
   receiving, by the link server, a new second address information and a new second validation code; and
   updating, by the link server, the second address information of the remote device and the second validation code stored in the storage unit with the new second address information and the new second validation code.

6. A P2P connecting method, applied to a client device for creating a P2P connection to a remote device through a link server, the P2P connecting method comprising:
   sending, by the client device, a connection request to the link server for connecting to the remote device;
   searching for a validation token by the client device to verify whether the validation token exists;
   sending, by the client device, the validation token to the link server when the validation token exists;
   detecting, by the client device, a first acknowledgement packet returned by the link server to confirm whether the first acknowledgement packet is received, wherein the first acknowledgement packet represents that the validation token is verified successfully; and executing, by the client device, a connection verifying procedure when the first acknowledgement packet is received, wherein the connection verifying procedure comprises:
generating a first validation code;
storing the first validation code;
sending the first validation code and a first address information of the client device to the link server;
receiving a second address information of the remote device and a second validation code from the link server; and
creating the P2P connection to the remote device according to the second address information of the remote device, the first validation code and the second validation code.

7. The P2P connecting method according to claim 6, further comprising:
executing, by the client device, a connection verifying procedure when the validation token is not existed or when the first acknowledgement packet is not received, wherein the connection verifying procedure comprises:
receiving a verifying request from the link server;
returning a first personal identity confirmation code to the link server in response to the verifying request; and
receiving the validation token from the link server after the first personal identity confirmation code is returned, and continuously executing the step of sending the connection request to the link server for connecting to the remote device.

8. The P2P connecting method according to claim 6, wherein the step of creating P2P connection to the remote device according to the second address information of the remote device, the first validation code and the second validation code comprises:
sending, by the client device, the second validation code to the remote device according to the second address information of the remote device;
detecting, by the client device, a second acknowledgement packet returned by the remote device to confirm whether the second acknowledgement packet is received, wherein the second acknowledgement packet represents that the second validation code sent to the remote device conforms to a stored second validation code stored in the remote device;
receiving, by the client device, the first validation code from the remote device;
comparing, by the client device, the received first validation code and the stored first validation code to confirm whether the received first validation code conforms to the stored first validation code;
connecting, by the client device, to the remote device for the P2P connection when the second acknowledgement packet is received and when the received first validation code conforms to the stored first validation code; and
disconnecting, by the client device, to the remote device for the P2P connection when the second acknowledgement packet is not received and when the received first validation code does not conform to the stored first validation code.

9. The P2P connecting method according to claim 6, wherein the validation token is a time-based personal identity confirmation code or an one-time personal identity confirmation code.

10. A communication system for a P2P connection, comprising:

a link server;
a client device, communicating with the link server, for sending a connection request to the link server, generating a first validation code, and sending the first validation code and a first address information of the client device to the link server, and
a remote device, communicating with the link server, for generating a second validation code and sending the second validation code and a second address information of the remote device to the link server;
wherein the link server verifies whether the client device has a valid validation token according to the connection request from the client device; and
wherein when the client device has the valid validation token, the link server receives the first validation code and the first address information of the client device, sends the received first validation code and the received first address information of the client device to the remote device, and sends the second address information of the remote device and the second validation code to the client device, so as to establish the P2P connection between the client device and the remote device according to the first address information of the client device, the first validation code, the second address information of the remote device, and the second validation code.

11. The communication system according to claim 10, further comprising:
a specific device, communicating with the link server;
wherein the link server stores a device registration table, and the device registration table records a binding information representing that the specific device binds with the remote device; and
wherein when the client device does not have the valid validation token, the link server sends a personal identity confirmation code to the specific device and requests the client device to return the personal identity confirmation.

12. The communication system according to claim 11, wherein the binding information comprises a contact account of the specific device and a corresponding login name of the remote device, and the link server sends a notification having the personal identity confirmation code to the contact account.

13. The communication system according to claim 11, wherein the personal identity confirmation code is a time-based personal identity confirmation code or an one-time personal identity confirmation code.

14. The communication system according to claim 10, wherein the validation token is a time-based validation token or an one-time validation token.

15. The communication system according to claim 10, wherein when the client device receives the second address information and the second validation code from the link server, the client device connects to the remote device according to the second address information, and the remote device connects to the client device according to the first address information, so as to form the communication connection between the client device and the remote device;
wherein when the communication connection between the client device and the remote device is formed, the client device sends the second validation code to the remote device for verification, and the remote device sends the first validation code to the client device for verification; and
wherein when both the verifications are verified successfully by the remote device and the client device, the remote device and the client device both agree to establish the P2P connection between the remote device and the client device.

\* \* \* \* \*